(12) United States Patent
Hattori et al.

(10) Patent No.: US 6,871,159 B2
(45) Date of Patent: Mar. 22, 2005

(54) OCCUPANT WEIGHT DETECTING DEVICE

(75) Inventors: Katsu Hattori, Aichi-ken (JP); Morio Sakai, Toyota (JP); Yukihiro Yamamoto, Okazaki (JP); Masaki Mori, Kariya (JP); Yoshikazu Suzumura, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 41 days.

(21) Appl. No.: 10/382,879

(22) Filed: Mar. 7, 2003

(65) Prior Publication Data
US 2003/0216886 A1 Nov. 20, 2003

(30) Foreign Application Priority Data

Mar. 7, 2002 (JP) ........................................ 2002-062156
Feb. 25, 2003 (JP) ........................................ 2003-047854

(51) Int. Cl.[7] .............................................. G01G 19/00
(52) U.S. Cl. ...................... 702/173; 702/188; 702/101; 177/144; 280/735; 701/45
(58) Field of Search ................................ 177/144, 136, 177/25.13; 280/735; 296/65.01; 340/667; 701/45; 702/101, 173, 188; 73/862, 627

(56) References Cited

U.S. PATENT DOCUMENTS 6,271,484 B1 * 8/2001 Tokutsu ................... 177/25.13

FOREIGN PATENT DOCUMENTS

| JP | 2000-203324 A | 7/2000 |
| JP | 2000-280813 A | 10/2000 |
| JP | 2000-283834 A | 10/2000 |
| JP | 2001-21411 A | 1/2001 |
| JP | 2002-243528 A | 8/2002 |

* cited by examiner

Primary Examiner—John Barlow
Assistant Examiner—Stephen J. Cherry
(74) Attorney, Agent, or Firm—Burns, Doane, Swecker & Mathis, L.L.P.

(57) ABSTRACT

An occupant weight detecting device includes a load detecting means equipped to a seat body for detecting a load applied to the seat body, a calculating means for calculating an initial load value during the seat body under an initial condition based upon a detected load value by the load detecting means and for calculating a value of an occupant load applied to the seat body by subtracting the initial load value from the detected load value, and a filter housed in the calculating means and possessing a cutoff frequency so as to attenuate a fluctuation of the detected load value generated due to an element other than a deterioration inherent to the load detecting means.

17 Claims, 14 Drawing Sheets

OCCUPANT WEIGHT DETECTING DEVICE

CROSS REFERENCE TO RELATED APPLICATIONS

This application is based on and claims priority under 35 U.S.C. § 119 with respect to a Japanese Patent Application 2002-062156, filed on Mar. 7, 2002 and a Japanese Patent Application 2003-047854, filed on Feb. 25, 2003, the entire content of which is incorporated herein by reference.

FIELD OF THE INVENTION

This invention generally relates to an occupant weight detecting device, in which a weight applied to a seat is calculated based upon a value detected by a load sensor equipped to a seat body.

BACKGROUND OF THE INVENTION

According to a conventional occupant weight detecting device, the occupant weight may be detected in error due to the secular deterioration inherent to a load sensor. In order to solve the aforementioned problem, a weight detecting device for a vehicle is disclosed in a Japanese Patent Laid-Open publication No. 2001-21411. The disclosed device is provided with a load sensor equipped to a seat body and a judging means for judging whether or not there is an occupant/object on the seat body. A value detected by the load sensor during no occupant/object on the seat body is set to be an initial load value under an initial condition of the seat body. The disclosed device is further provided with a calculating means for calculating an actual weight by subtracting the initial load value from the value detected by the load sensor.

As described above, the detected value during no occupant/object on the seat body is set to be a drift amount under the initial condition of the seat body so that the value detected by the load sensor is corrected based upon the drift amount. In this case, the condition of the seat body, i.e. whether the occupant/object is on the seat body is judged based upon the fluctuation of the load value detected by the sensor or a vehicle door locked condition.

However, if an object is left on the seat body when the occupant is getting out of the vehicle, the judging means judges that the for an initial load is applied for the seat body even if there is the object on the seat body. Therefore, the correcting process is performed based upon the detected value including the load of the object. Further, when the occupant is taking on the vehicle without the object, the load value is detected in error by the load of the object. That is, the disclosed weight detecting device may be easily affected by external factors such as the object on the seat body. Accordingly, the drift amount under the initial condition of the seat body due to the secular deterioration may not be accurately offset.

The present invention therefore seeks to provide an occupant weight detecting device capable of improving accuracy for offsetting a detected value by a sensor under an initial condition of a seat body.

SUMMARY OF THE INVENTION

According to an aspect of the present invention, an occupant weight detecting device includes a load detecting means equipped to a seat body for detecting a load applied to the seat body, a calculating means for calculating an initial load value during a condition of the seat body is under an initial condition based upon a detected load value by the load detecting means and for calculating a value of an occupant load applied to the seat body by subtracting the initial load value from the detected load value, and a filter with a cutoff frequency so as to attenuate a fluctuation of the detected load value generated due to an element other than a deterioration inherent to the load detecting means.

It is preferable that the calculating means includes a first threshold value including a first range and the filter is escaped based on the detected load value when the detected load value deviates from the first threshold value.

It is further preferable that the calculating means includes a second threshold value which is within the first range and corresponds to a fluctuation of the detected load value due to the deterioration inherent to the load detecting means.

The detected load value is filtered when the detected load value is within the second threshold value.

It is still further preferable that the calculating means filters the detected load value until an output value from the filter meets the second threshold value when the detected load value is within the first threshold value and yet deviates from the second threshold value.

BRIEF DESCRIPTION OF THE DRAWING FIGURES

The foregoing and additional features and characteristics of the present invention will become more apparent from the following detailed description considered with reference to the accompanying drawing figures wherein:

FIG. 1 a perspective view illustrating a seat provided with an occupant weight detecting device according to embodiments of the present invention;

DETAILED DESCRIPTION OF THE INVENTION

Figure 1:
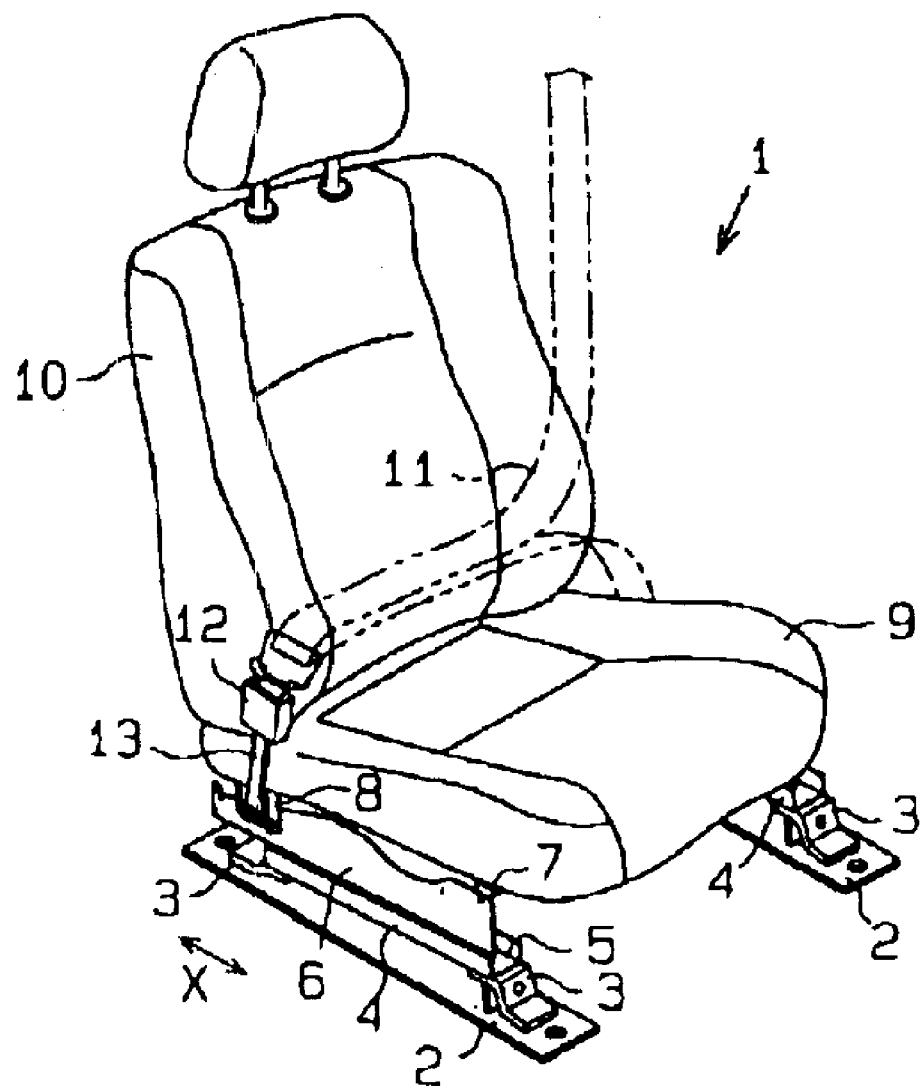

As illustrated in FIG. 1, a seat body 1 according to embodiments of a present invention is fixedly mounted on a vehicle floor (not shown) by a pair of supporting frames 2 which extend in a substantially longitudinal direction, i.e. in a direction represented by an "x" arrow, being arranged to be substantially parallel to each other. Each supporting frame 2 is firmly equipped with a pair of brackets 3 on front and rear portions thereof and a lower rail 4 is fixed to the pair of brackets 3 to be arranged along the supporting frame 2. The lower rail 4 possesses an approximately U shaped cross section with an upward opening. The upward opening is elongated in the vehicle longitudinal direction so as to define a slide groove 5. A pair of upper rails 6 are disposed into the slide grooves 5 of the lower rails 4 so as to be slidably movable in the vehicle longitudinal direction.

Figure 2:
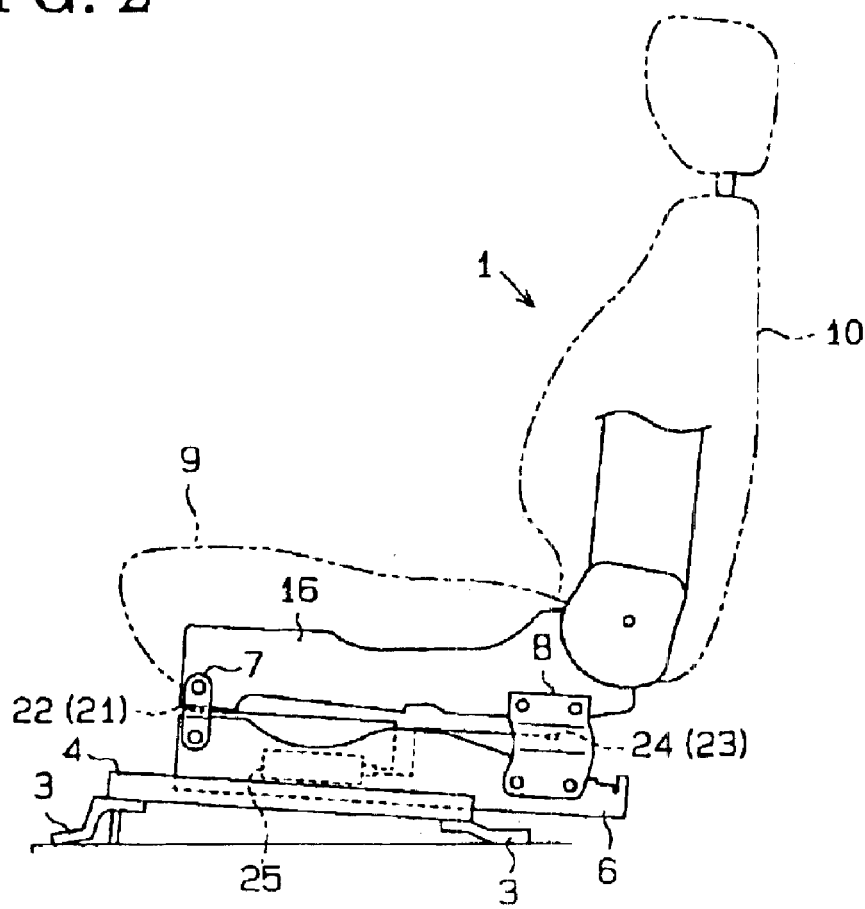
FIG. 2 is a side view illustrating the seat provided with the occupant weight detecting device according to the embodiments of the present invention.
Figure 3A:
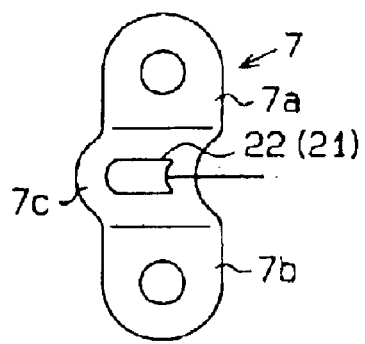
FIG. 3(a) is a front view illustrating a front bracket equipped to a seat body illustrated in FIG. 2.

As seen in FIG. 2, each upper rail 6 is equipped with a front bracket 7 and a rear bracket 8. A pair of lower arms 16, which supports a seat cushion 9 and a seat back 10, is coupled with the pair of upper rails 6 by using the front brackets 7 and the rear brackets 8. As illustrated in FIG. 3(a), the front bracket 7 of each upper rail 6 is provided with an upper side fastening portion 7a, a lower side fastening portion 7b, and a distortion portion 7c. The upper side fastening portion 7a and the lower side fastening portion 7b are respectively fastened to a front side of the lower arm 16 and a front side of the upper rail 6. The distortion portion 7c is defined between the upper side fastening portion 7a and the lower side fastening portion 7b. The distortion portion 7c of each front bracket 7 is attached with a front right-hand side sensor 21 (a load detecting means, hereinafter referred to as a sensor 21) and a front left-hand side sensor 22 (a load detecting means, hereinafter referred to as a sensor 22). Each sensor 21 and 22 is provided with a distortion detecting element such as a strain gauge. The distortion detecting element can electrically detect a distorted amount of the distortion portion 7c in response to the load applied to the seat cushion 9.

Figure 3B:
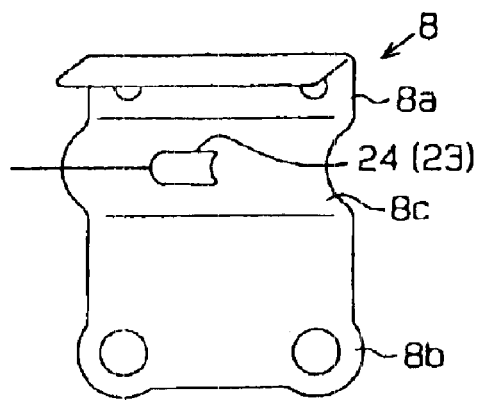
FIG. 3(b) is a front view illustrating a rear bracket equipped to the seat body illustrated in FIG. 2.

As illustrated in FIG. 3(b), the rear bracket 8 of each upper rail 6 is provided with an upper side fastening portion 8a, a lower side fastening portion 8b, and a distortion portion 8c. The upper side fastening portion 8a and the lower side fastening portion 8b are respectively fastened to a rear side of the lower arm 16 and a rear side of the upper rail 6. The distortion portion 8c is defined between the upper side fastening portion 8a and the lower side fastening portion 8b. The distortion portion 8c of each rear bracket 8 is attached with a rear right-hand side sensor 23 (a load detecting means, hereinafter referred to as a sensor 23) and a rear left-hand side sensor 24 (a load detecting means, hereinafter referred to as a sensor 24). Each sensor 23 and 24 is provided with a distortion detecting element such as a strain gauge. The distortion detecting element can electrically detect a distorted amount of the distortion portion 8c in response to the load applied to the seat cushion 9.

Figure 4:
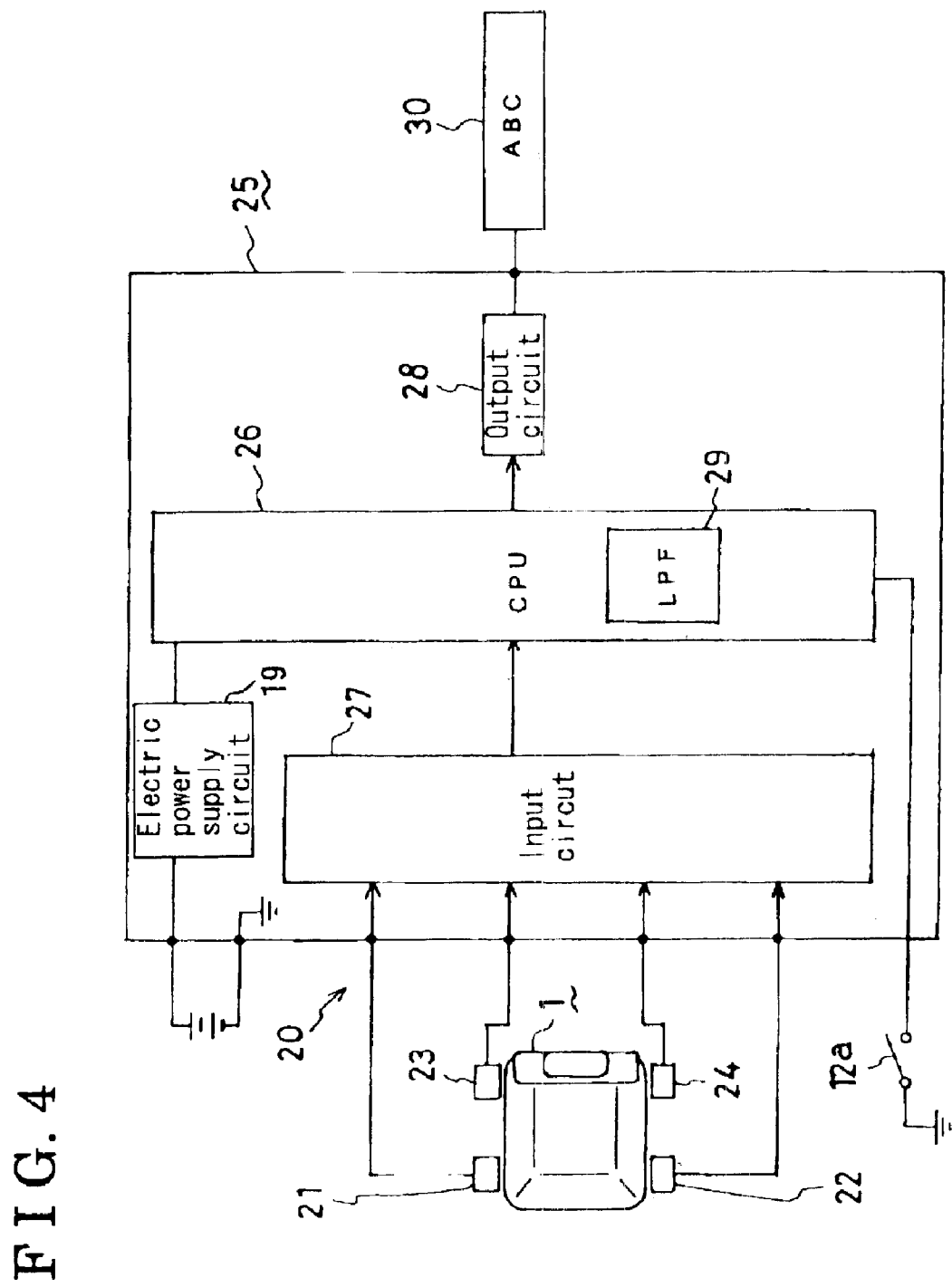
FIG. 4 is a block diagram illustrating an electrical structure of the occupant weight detecting device according to the embodiments of the present invention.

As explained in FIG. 4, values detected by the four sensor 21, 22, 23, and 24, which represent the distorted amounts of the four deflection portions 7c and 8c, are inputted into a controller 25 which includes an electric power supply circuit 19, a central processing unit 26 (a calculating means, hereinafter referred to as a CPU 26), an input circuit 27, and an output circuit 28. The input circuit 27 converts analog signals from the four sensors 21, 22, 23, and 24, which represent the detected values of the distorted amounts of the four deflection portions 7c and 8c, to digital signals by an A/D converter (not shown). The digital signals representing the detected values are inputted into the CPU 26 and a total detected value (sum of the detected values from the sensors 21, 22, 23, and 24) is calculated based upon the detected values from the sensors 21, 22, 23, and 24. A low-pass filter 29 (a filter) is in the CPU 26, and the filter 29 is able to filtering the total detected value in accordance with a control program. Subsequently, an occupant weight value (a detected value) is calculated by the CPU 26 based upon an outputted value from the low-pass filter 29, thereby an occupant judgment can be executed based upon the calculated occupant weight value representing the occupant weight being applied to the seat body 1. The occupant weight according to the embodiments of the present invention is not limited to a weight of an occupant seated on the seat body 1. A weight of an object being present on the seat body 1 can be applied thereto. The occupant judgment is performed for judging the presence of a child restraint system (hereinafter, referred to as a CRS) on the seat body 1 and which is seated on the seat body 1, a child or an adult. The result of the occupant judgment is outputted to the output circuit 28 and is further outputted to an air-bag controller 30 so as to control operation of an air-bag system (not illustrated). A series of process of the CPU 26 for calculating the occupant weight based upon the detected values by the sensors 21, 22, 23, and 24 and for performing the occupant judgment will be described later.

As illustrated in FIG. 1, an anchor bracket 13 is connected to the upper rail 6 at the longitudinally right-hand side of the seat body 1, which supports a seat belt anchor 12 capable of fastening a seat belt 11. The seat belt anchor 12 possesses a seat belt on/off switch 12a (illustrated in FIG. 4) which is turned on in response to fastening the seat belt 11. The condition of the seat belt 11 can be detected by the CPU 26 which is inputted with the on/off signal from the seat belt switch 12a.

Next, the series of process of the CPU 26 according to the first embodiment of the present invention is described hereinbelow with reference to flowcharts illustrated in FIGS. 5 and 6. The series of process is first performed for correcting the detected values from the sensors 21, 22, 23, and 24 under an initial condition of the seat body 1, i.e. during no object being present on the seat cushion 9, to be an original point (e.g. a zero point) (hereinafter, referred to an original point correction), for calculating the actual occupant weight based upon the corrected detected values, and for performing the occupant judgment based upon the actual occupant weight.

Figure 5:
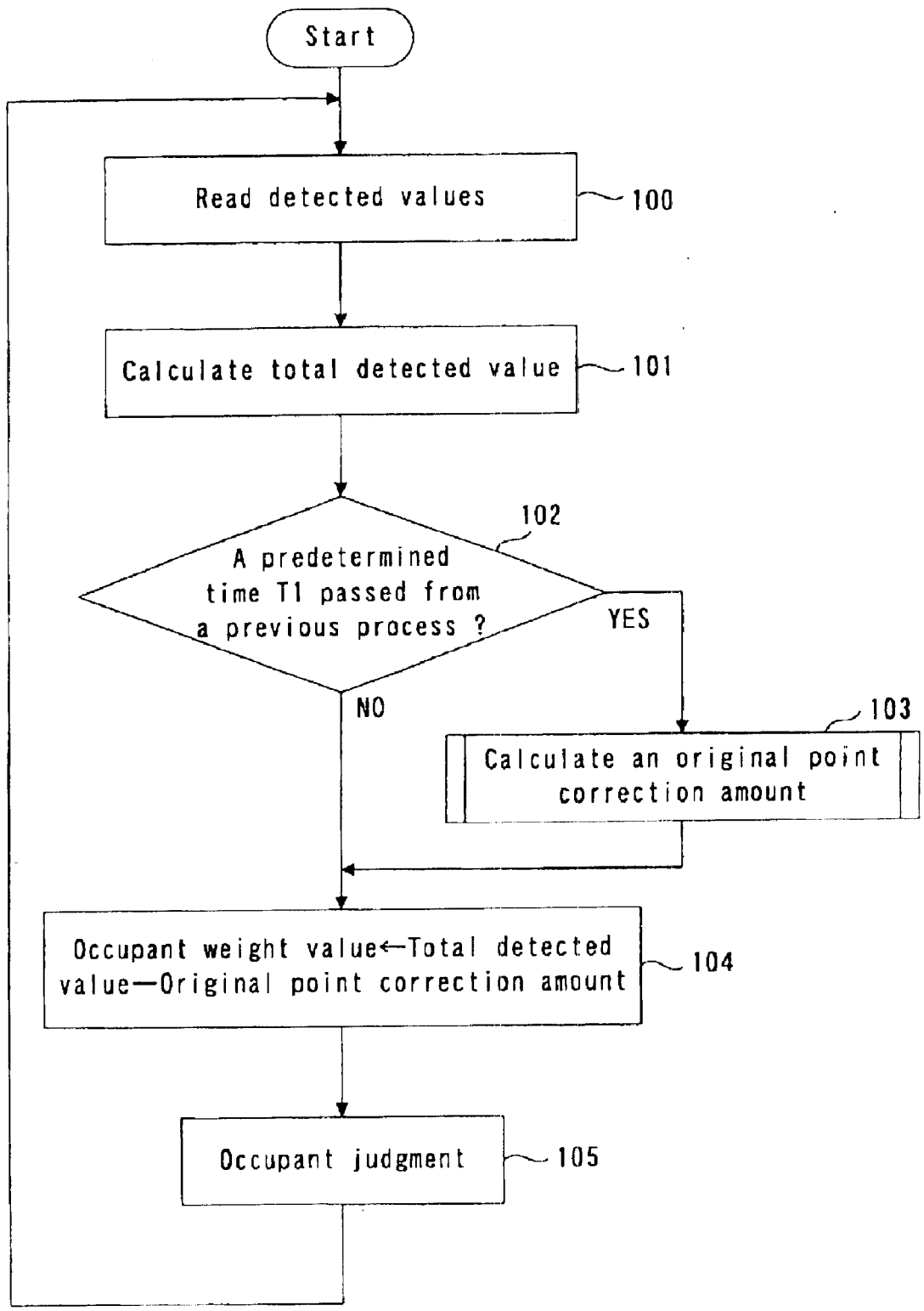
FIG. 5 is a flowchart explaining a process for calculating an original point correction amount and for performing an occupant judgment during an ignition switch being on according to the embodiments of the present invention.

The process illustrated in FIG. 5 is performed at a predetermined cycle (e.g. a few msec) when an ignition switch (not illustrated) of the vehicle is switched on in response to a turning operation of a vehicle key (not shown) inserted into a key cylinder (not shown). The CPU 26 performs an initial process in response to the switch on of the ignition switch and then performs a main routine illustrated in FIG. 5 at the predetermined cycle from step 100 (a reading means), wherein the detected values from the sensors 21, 22, 23, and 24 are inputted into the CPU 26. The process then proceeds to step 101 for calculating the total detected value by summing the detected values from the sensors 21, 22, 23, and 24. At step 102 (a predetermined time judging means), the CPU 26 judges whether or not a predetermined time T1 has passed since a previous process has executed. It is preferable that the predetermined time T1 is set, for example to be an arbitrary time for performing the original point correction once a day. When the CPU 26 judges at step 102 that the predetermined time T1 has already passed, the process proceeds to step 103 (a correction amount calculating means) for performing an original point correction amount calculating process. The original point correction amount, i.e. a load value under the initial condition, is stored in a memory (not shown) of the CPU 26 and the process proceeds to step 104 (an occupant load calculating means). On the other hand, when the CPU 26 judges that the predetermined time T1 has not passed since the previous process has executed at step 102, the process directly proceeds to step 104. That is, the predetermined time T1 is referred to as a cycle for performing the original point correction.

It is preferable that the predetermined time T1 is set not to be a multiple number of a numeric value 24 representing 24 hours. Therefore, the original point correction is designed not to be performed concurrently with occupant's actions which may be constantly repeated every day such as the occupant's vehicle drive for commuting every morning. Further, the predetermined time T1 is set to be a prime factor within the above-described time range. Therefore, the original point correction is designed not to be performed concurrently with occupant's actions which may be constantly repeated every few hours. At step 104, the occupant weight is calculated by subtracting the original point correction amount being stored in the memory from the total detected value. That is, the load value under the initial condition is corrected to be the zero point for calculating the actual occupant value. The process then proceeds to step 105 so as to perform the occupant judgment on the seat body 1 based upon the occupant weight. As aforementioned, the result (signal) of the occupant judgment is outputted to the air-bag controller 30 via the output circuit 28.

Figure 6:
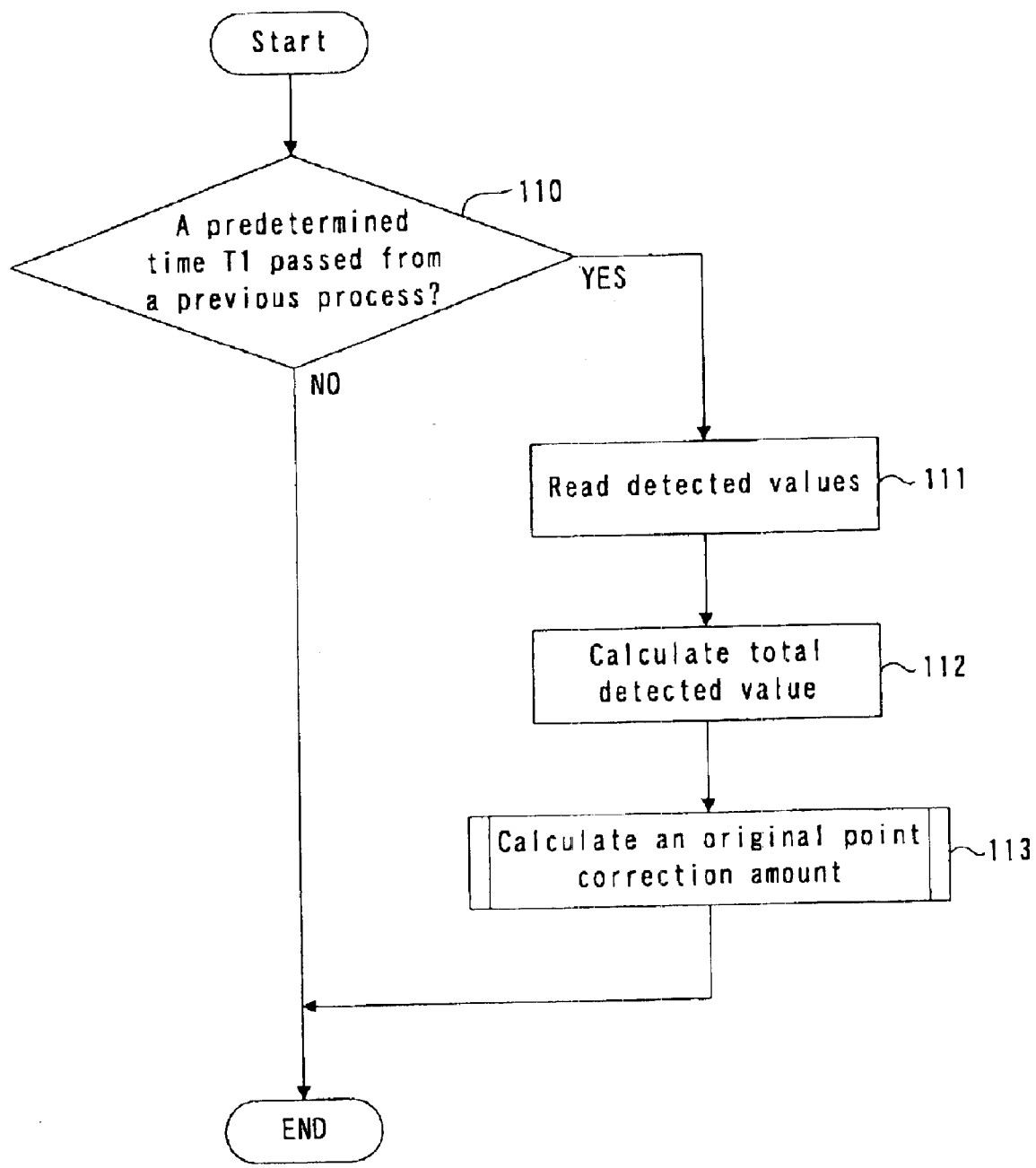
FIG. 6 is a flowchart explaining a process for calculating an original point correction amount during the ignition switch being off according to the embodiments of the present invention.

The process illustrated in FIG. 6 is performed when the ignition switch (not illustrated) of the vehicle is switched off. The CPU 26 according to the first embodiment of the present invention is shifted from a normal mode to a sleep mode, i.e. to a low electric power consumption mode, in which the CPU 26 is activated only by consuming low electric power, when the ignition switch is switched off in response to unhooked operation of the vehicle key from the key cylinder. However, when the predetermined time T1 is passed after the previous process was performed, the CPU 26 is automatically shifted from the sleep mode to the normal mode by a timer (not shown) of the CPU 26. When the CPU 26 is shifted to the normal mode, the process first proceeds to step 110 for judging whether or not the predetermined time T1 has passed since the previous process has performed. In this case, the on/off condition of the ignition switch at the previous process has no preference. When the CPU 26 judges at step 110 that the predetermined time T1 has passed, the process proceeds to step 111, wherein the detected values from the sensors 21, 22, 23 and 24 are inputted in to the CPU 26. At step 112, the total detected value is calculated by summing the detected values from the sensors 21, 22, 23, and 24. At step 113, the original point correction amount detecting process is performed and the original point correction amount is stored in the memory. The CPU is then shifted to the sleep mode and the process by the CPU 26 under the ignition switch being off is completed. On the other hand, when the CPU 26 judges at step 110 that the predetermined time T1 has not passed yet, the process is directly terminated under the sleep mode. The original point correction amount calculated by the above-described process is employed for calculating the occupant weight at step 104 illustrated in FIG. 5 when the ignition switch is turned on within the predetermined time T1 from the off condition of the ignition switch.

Next, the original point correction amount calculating process performed at step 103 in FIG. 5 and at step 113 in FIG. 6 is described hereinbelow referring to a flowchart illustrated in FIG. 7. As described above, the process is performed for calculating the original point correction amount, i.e. for calculating the load value under the initial condition. More particularly, this process is performed for calculating the original point correction amount, on which an only drift amount due to secular deterioration of the sensors 21, 22, 23, and 24 reflects. The secular deterioration is inherent to the sensors. If other drift amounts due to other factors than the secular deterioration reflects on the original point correction amount, the occupant weight may be determined in error. External environments and lading on the seat body 1 represent the other factors than the secular deterioration. The drift amount due to the external environments is relatively as small as the drift amount due to the secular deterioration, and yet the changes due to the external environments vary at a shorter cycle than the changes due to the secular deterioration. For example, the deterioration by the external environments include deterioration due to mechanical stress of the sensors 21, 22, 23, 24, deterioration due to heat and moisture of the sensors, chemical deterioration due to acid adherence to the sensors, lading or contact of the object with the seat body 1, temperature fluctuation of each sensor 21, 22, 23, and 24, position fluctuation of a seat sliding mechanism, and a vehicle parking condition on a slope. The drift amount due to the lading is generally greater than the change amount due to the secular deterioration. For example, the drift due to the lading may occur when the occupant is seated on the seat body 1, when the CRS is positioned on the seat body 1 for a relatively long time, when a heavily-weighted object is present on the seat body 1 for a relatively long time, or the like.

Figure 7:
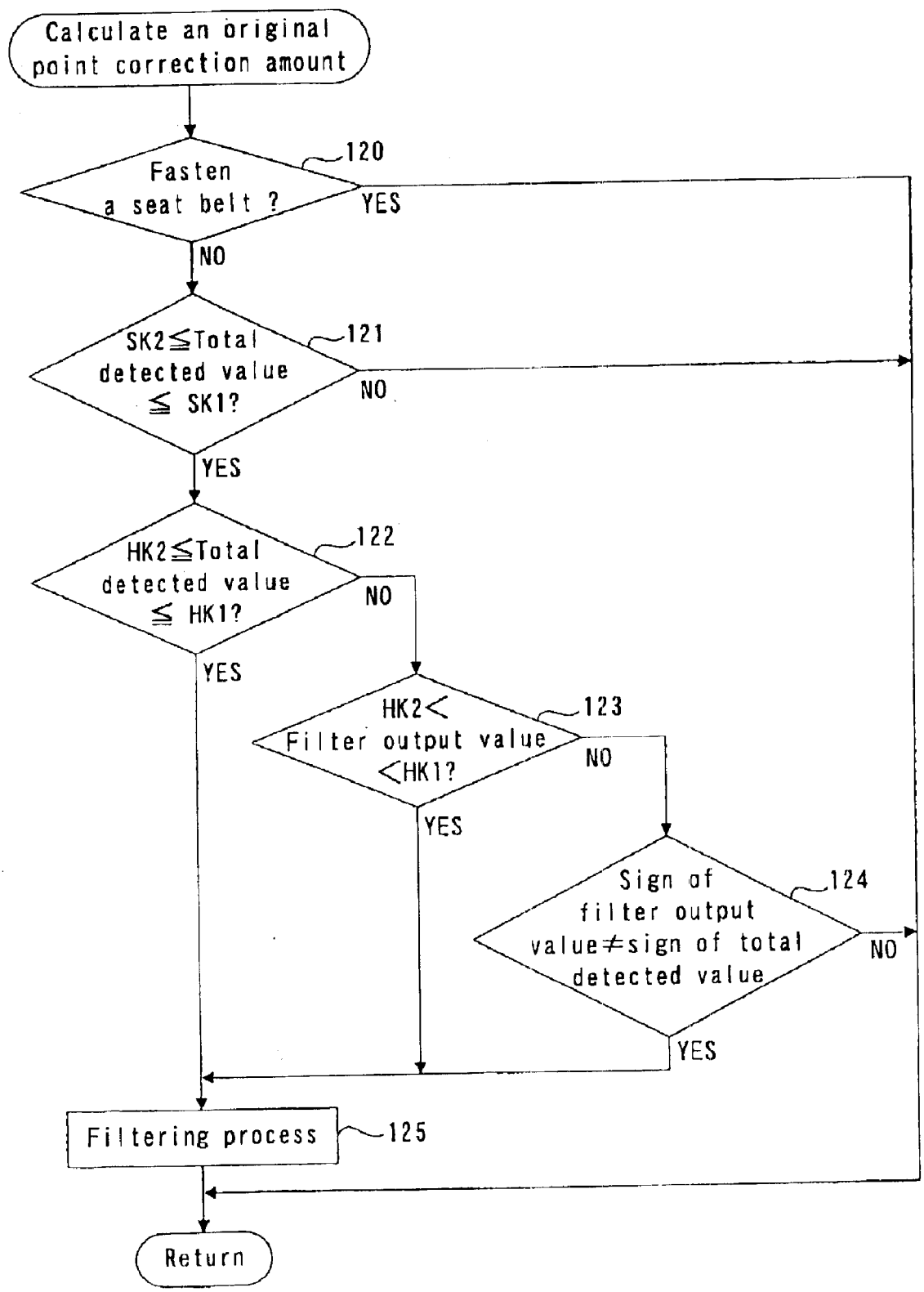
FIG. 7 is a flowchart explaining a subroutine for calculating the original point correction amount according to the embodiments of the present invention.
Figure 8:
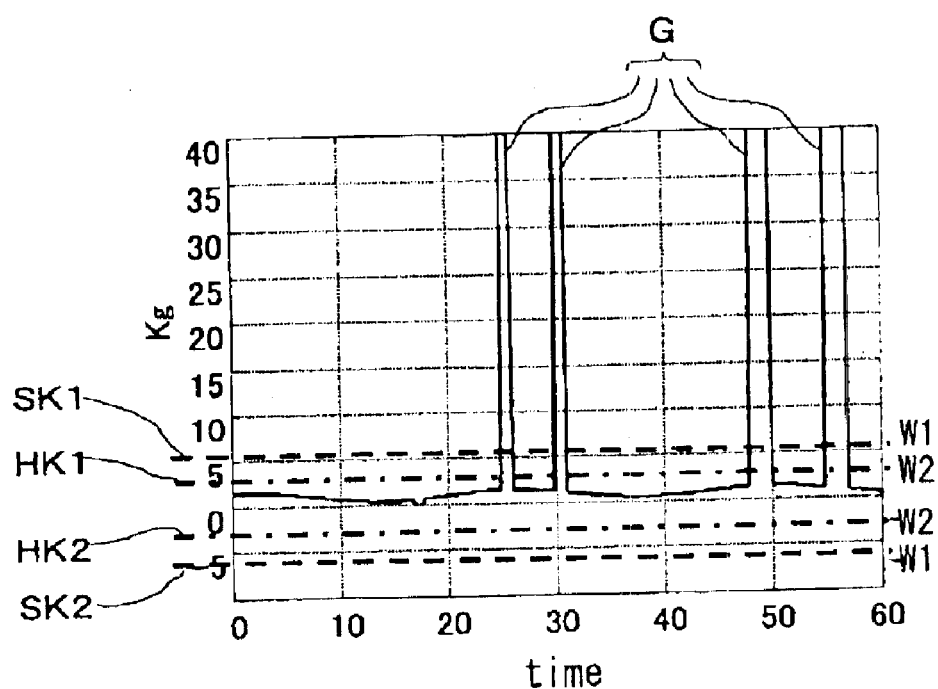
FIG. 8 is a timing chart explaining an example of a fluctuation of a total detected value by sensors illustrated in FIG. 2.

As explained in FIG. 7, the process first proceeds to step 120 (a seat belt condition judging means) for judging whether or not the seat belt on/off switch 12a is on, i.e. for judging whether or not the seat belt 12 is fastened. When the seat belt switch 12a is judged to be on, the process is directly terminated. When the seat belt switch 12a is on, the CPU 26 judges that there is the occupant or the CRS on the seat cushion 9, thereby the original point correction amount is not calculated. On the other hand, when the seat belt switch 12a is judged to be off at step 120, the process proceeds to step 121 (a second judging means) for judging whether or not the total detected value is a first threshold value. The first threshold value includes a predetermined range (first range) which is substantially equal to or less than a threshold value (first value) SK1 and substantially equal to or greater than a threshold value SK2. FIG. 8 is a timing chart for explaining an example of a fluctuation of the total detected value. As illustrated in FIG. 8, the threshold values SK1 and SK2 according to the first embodiment of the present invention are respectively set for example, at W1 and −W1. That is, the first threshold value includes the predetermined range which is substantially equal to or less than W1 and substantially equal to or greater than −W1. When the detected values from the sensors 21, 22, 23, and 24 are varied due to the lading, the total detected value is designed to deviate from the first threshold value of the threshold values SK1 and SK2 (second values). The deviation of the total detected value is illustrated with a reference number "G" in FIG. 8. When the total detected value is judged at step 121 to deviate from the first threshold value, the original point correction amount calculating process is directly terminated. As described above, when the total detected value is varied due to lading, the original point correction amount is not calculated. Therefore, the original point correction amount, on which the drift amount due to lading is not reflected, can be more accurately calculated. On the other hand, when the total detected value is judged at step 121 to be the first threshold value, the process proceeds to step 122 (a first judging means).

At step 122, the CPU 26 judges whether or not the total detected value is within a second threshold value that is substantially equal to or less than a threshold value HK1 and substantially equal to or greater than a threshold value HK2. As illustrated in FIG. 8, the threshold values HK1 and HK2 are respectively set, for example at W2 and −W2, both of which are within the first threshold value of the threshold values SK1 and SK2. Some experiences and experiments show that the threshold values HK1 and HK2 correspond to the drift amount of the total detected value due to the secular deterioration being inherent to the sensors 21, 22, 23, and 24. That is, the second threshold value is set to be a value from which the total detected value under the original point won't deviate only due to the secular deterioration. When the total detected value is judged at step 122 to be within the second threshold value, the process proceeds to step 125 for filtering the total detected value by the low pass filter 29 so as to calculate the original point correction amount. The drift amount due to the external environments varies with a relatively higher frequency than the drift amount due to the secular deterioration of the sensors. The low pass filter 29 according to the first embodiment of the present invention is designed to possess a cutoff frequency at fc (cycle time: T1). Therefore, the drift amount due to the external environments can be attenuated by filtering the total detected value by the low pass filter 29.

As described above, the original point correction amount according to the first embodiment of the present invention can be effectively calculated reflecting only the drift amount of the total detected value due to the secular deterioration being inherent to the sensors 21, 22, 23, and 24 thereon. Therefore, the accuracy for detecting the original point correction amount can be improved.

On the other hand, when the total detected value is judged at step 122 to deviate from the second threshold value, the process proceeds to step 123 (an output value judging means). That is, when the total detected value is judged at step 121 to be within the first threshold value of the threshold values SK1 and SK2 and is not judged at step 122 to be within the second threshold value of the threshold values HK1 and HK2, the process proceeds to step 123. At step 123, the CPU 26 judges whether or not the output value from the low pas filter 29 is within a range that is substantially less than the threshold value HK1 and substantially greater than the threshold value HK2. When the output value is judged at step 123 to be within the range, the process proceeds to step 125 for filtering the total detected value. On the other hand, when the output value is judged at step 123 to deviate from the range, the process proceeds to step 124 (a sixth judging means) for judging whether or not the sign of the total detected value is opposite to the sign of the output value. For example, when the signs thereof are judged to be opposite at step 124 in response to large load instantly applied to the seat body 1, the process proceeds to step 125 so as to filter the total detected value. On the other hand, when the signs thereof are judged to be the same at step 124, the original point correction amount calculating process is terminated without filtering the total detected value.

As described above, even when the total detected value deviates from the second threshold value at step 122 and the output value from the low pass filter 29 is within the range at step 123, the CPU 26 judges whether the output value from the low pass filter 29 is within the threshold values HL1 and HK2 which are the first range, thereby the filtering of the total detected value is performed at step 125. When the output value from the low pass filter 29 comes to out of the threshold values HK1 and HK2, i.e. when the output value from the low pass filter 29 is deviated from the second range defined by the threshold values HK1, HK2 at step 123, the process proceeds to step 124. There may be a case, for example that the total detected value instantly varies from W3 to −W3 both of which are beyond the second threshold value defined by W2 and −W2. The value W3 is set to be greater than the value W2. In this case, even if the output value from the low pass filter 29 has reached W2, i.e. the threshold value HK1, the filtering of the total detected value is repeated until the output value from the low pass filter 29 reaches −W2. As described above, when the total detected value is within the first threshold value, and yet deviates from the second threshold value, there is a case that the total detected value is filtered by the low pass filter 29. Therefore, the original point correction amount can correspond to the change of the total detected value with a high responsibility.

As described above, the threshold values HK1 and HK2 are set to be values that the output value from the low pass filter 29 can reach, i.e. the limit values that the total detected value can be corrected by the low pass filter 29. Therefore, unnecessary response of the original point correction amount relative to the change of the total detected value can be restrained, thereby the original point correction amount can be calculated with an improved accuracy.

Figure 9:
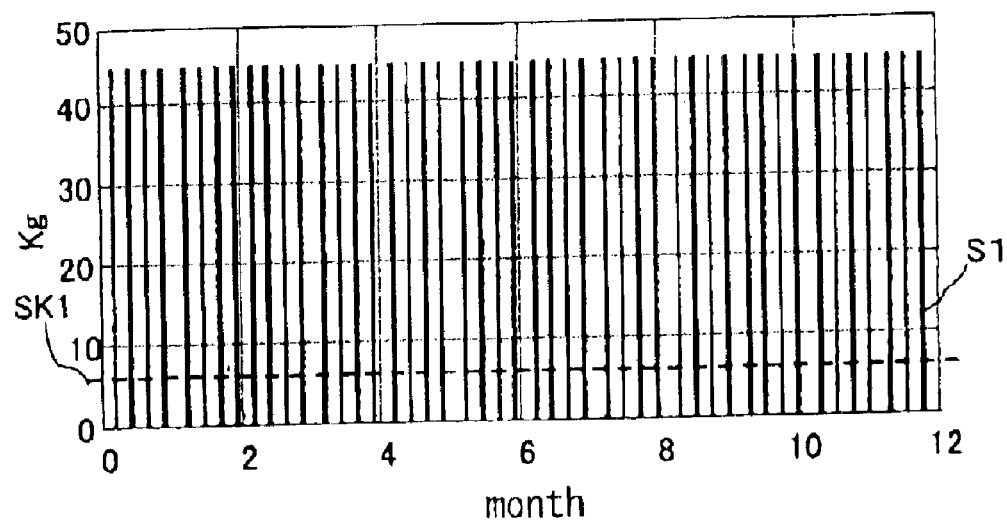
FIG. 9 is a timing chart simulated the fluctuation of the total detected value when an occupant is seated on the seat body according to the embodiments of the present invention.
Figure 10:
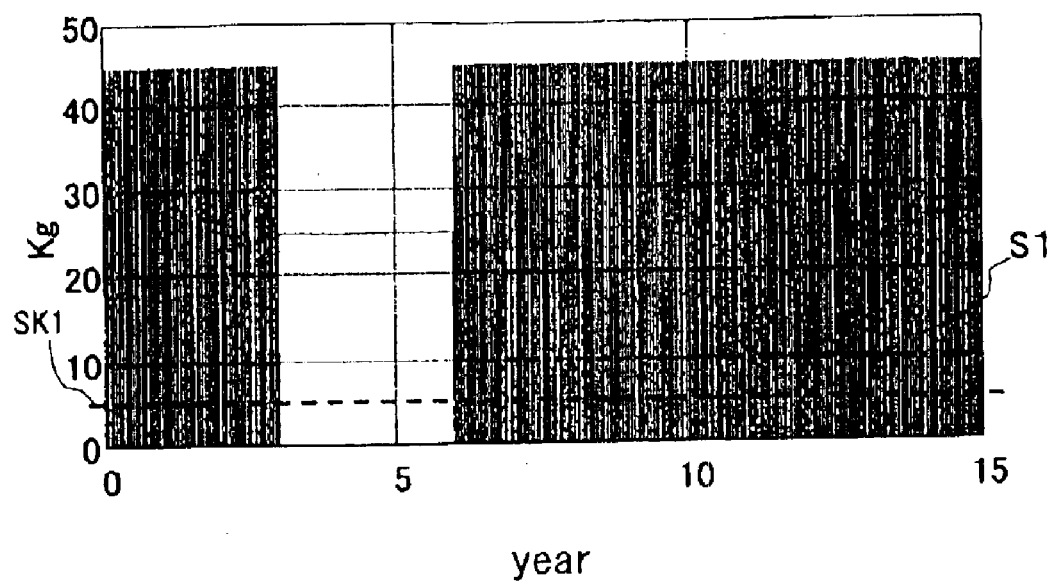
FIG. 10 is a timing chart simulated the fluctuation of the total detected value for 15 years in the same manner as illustrated in FIG. 9.

Next, operation of the occupant weight detecting device according to the first embodiment is described hereinbelow. The following description is given based upon a simulation performed with a pseudo data. FIG. 9 is a timing chart explaining an example of the fluctuation of the total detected value due to lading. A horizontal axis of FIG. 9 represents a time and a vertical axis thereof represents a total detected value S1. More specifically, FIG. 9 shows the fluctuation of the total detected value S1 for one year under the condition that the occupant, who weighs about 45 kgs, is assumed to be seated on the seat body 1 approximately for one hour on one's way for shopping and another one hour on one's way back home every Saturday and approximately for two hours on one's way for shopping and another two hours on one's way back home every Sunday. FIG. 10 is a timing chart explaining the fluctuation of the total detected value for fifteen years under the condition that the occupant is seated on the seat body 1 with the above-described cycle every week. The fluctuation of the total detected value S1 is beyond the first threshold value SK1. The total detected value S1 is substantially constant from the third year to the sixth year when the child restraint system is assumed to be present on the seat body 1.

Figure 11:
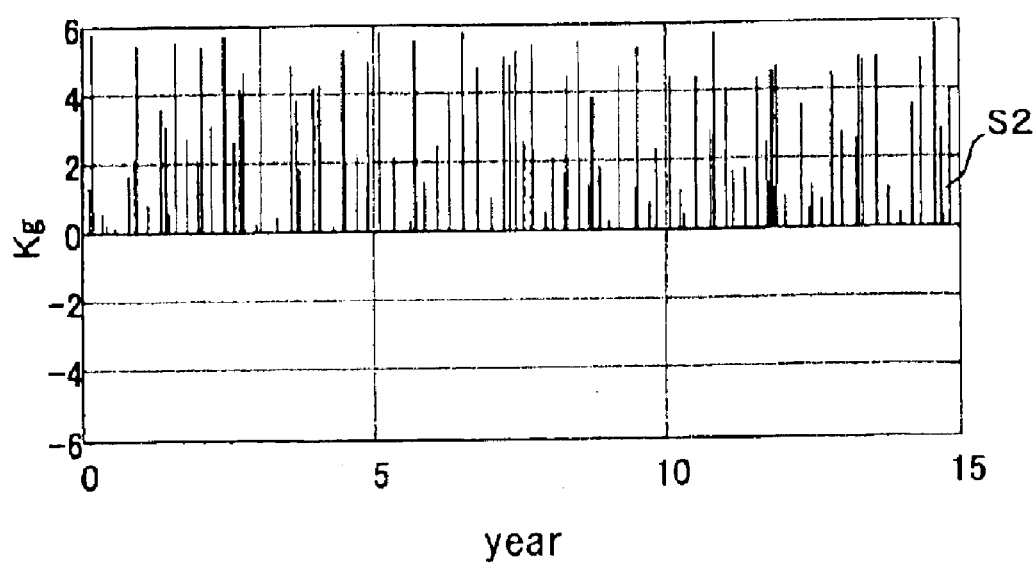
FIG. 11 is a timing chart simulated the fluctuation of the total detected value when an object is seated on the seat body according to the embodiments of the present invention.
Figure 12:
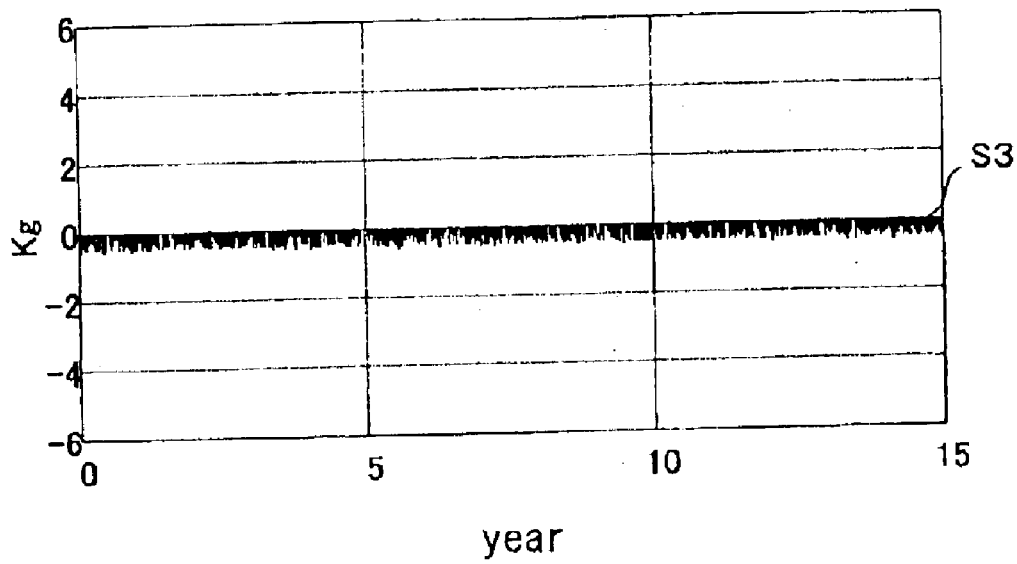
FIG. 12 is a timing chart simulated the fluctuation of the total detected value when a vehicle is parked on a slope according to the embodiments of the present invention.
Figure 13:
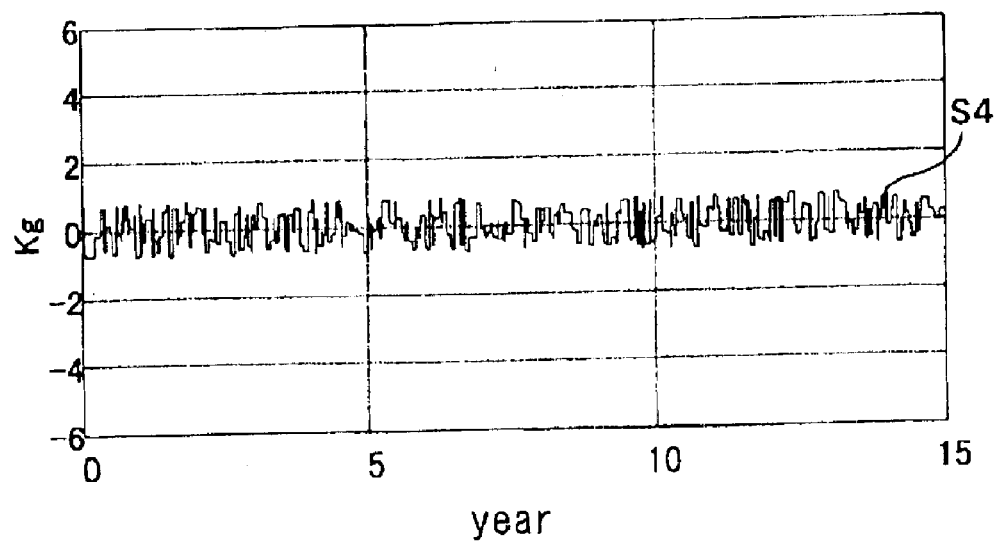
FIG. 13 is a timing chart simulated the fluctuation of the total detected value when the seat body is slidably moved according to the embodiments of the present invention.
Figure 14:
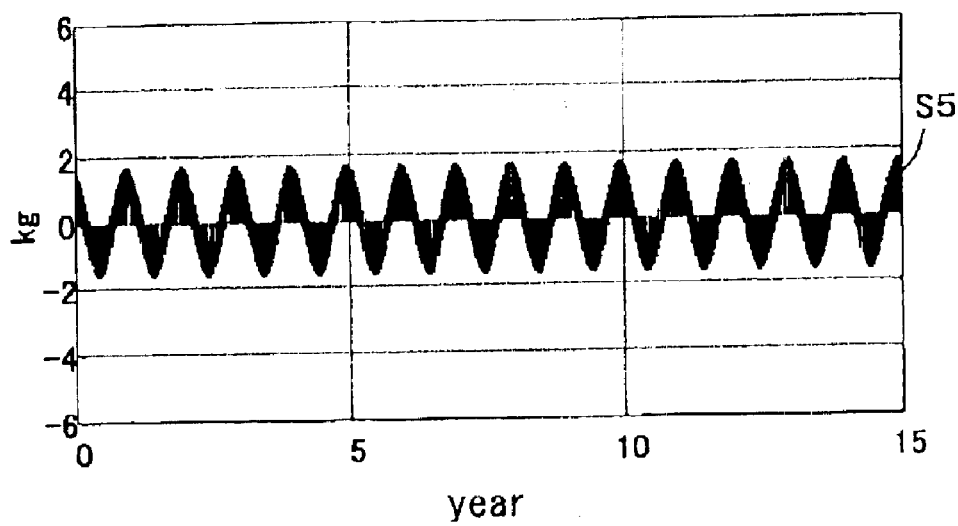
FIG. 14 is a timing chart simulated the fluctuation of the total detected value due to a temperature change according to the embodiments of the present invention.
Figure 15:
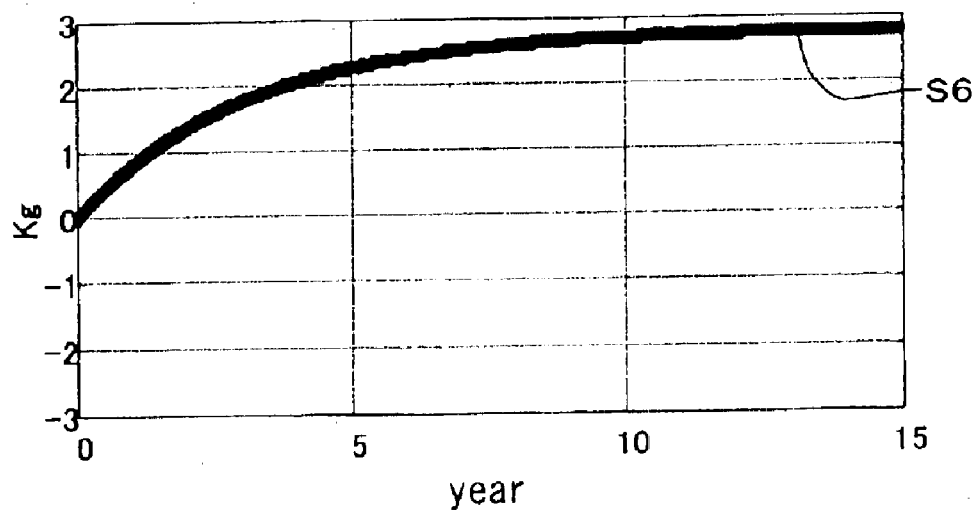
FIG. 15 is a timing chart simulated the fluctuation of the total detected value due to the secular deterioration inherent to the sensor according to the embodiments of the present invention.

FIGS. 11 through 14 are timing charts explaining examples of the fluctuation of the total detected value due to the external environmental factors. FIG. 11 shows a fluctuation of a total detected value S2 when an object is present on the seat body 1. FIG. 12 shows a fluctuation of a total detected value S3 when the vehicle is parked on a slope. FIG. 13 shows a fluctuation of a total detected value S4 when the upper rails 6 are slidably moved relative to the lower rails 4. FIG. 14 shows a fluctuation of a total detected value S5 when a vehicle internal temperature varies corresponding to the seasons, an air conditioning equipment, or the like. FIG. 15 shows a fluctuation of a total detected value S6 due to the secular deterioration being inherent to the sensors 21, 22, 23, and 24. As described above, the total detected value due to the external environmental factors varies at a shorter cycle compared with the fluctuation of the total detected value due to the secular deterioration of the sensors 21, 22, 23 and 24.

Figure 16:
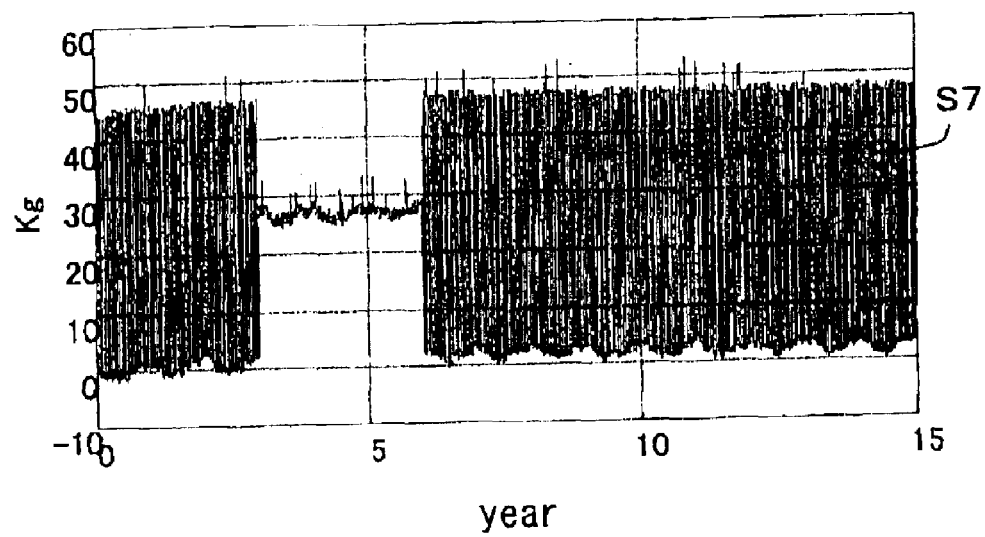
FIG. 16 is a timing chart simulated the fluctuation of the total detected value determined by combining all the total detected values through FIGS. 10–15.
Figure 17:
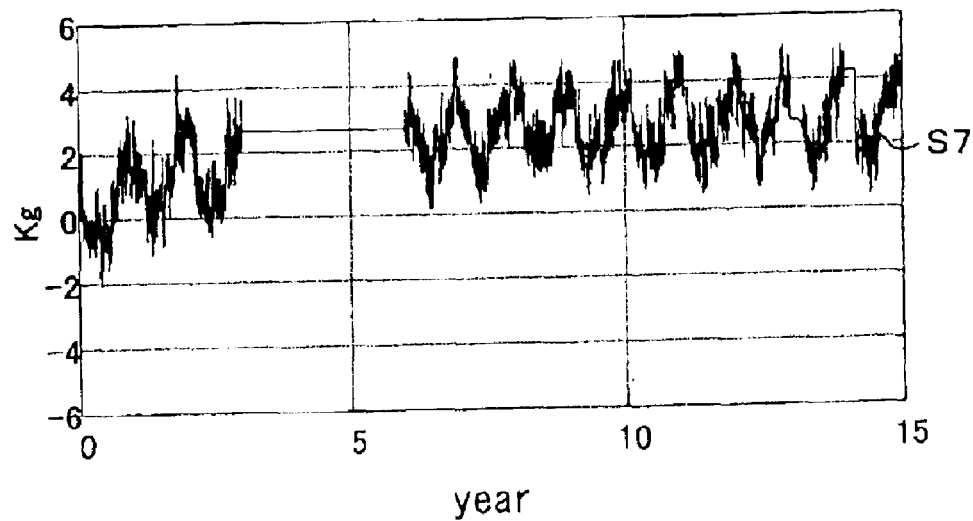
FIG. 17 is a timing chart simulated the fluctuation of the total detected value within a first threshold value defined by threshold values SK1 and SK2 according to the embodiments of the present invention.
Figure 18:
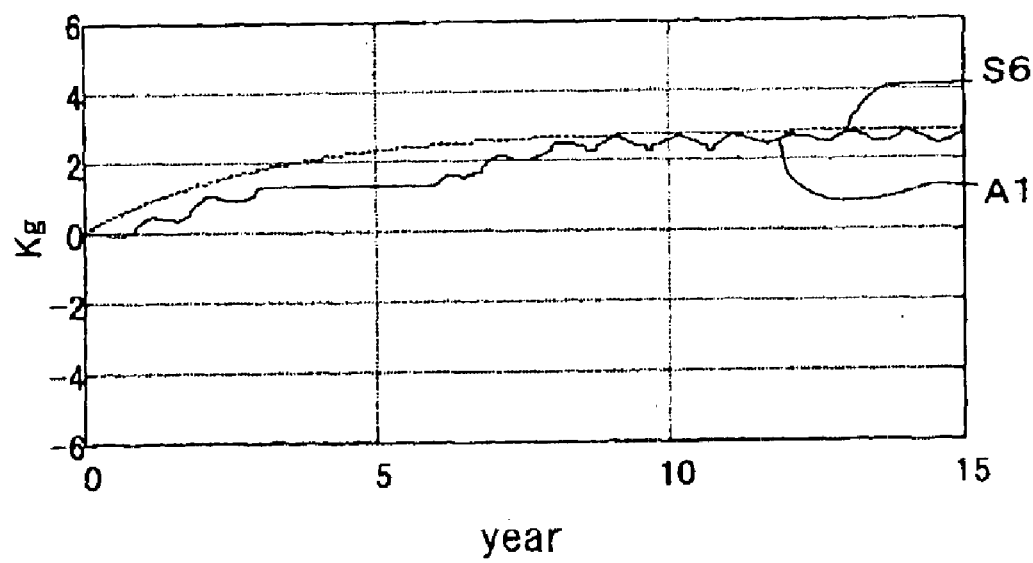
FIG. 18 is a timing chart for explaining a fluctuation of an original point correction amount according to the first embodiment of the present invention.

FIG. 16 shows a fluctuation of a total detected value S7 determined by combining all the total detected values S1 through S6 illustrated in FIGS. 10 through 15. FIG. 17 shows a fluctuation of the total detected value S7 between the first threshold value of the threshold values SK1 and SK2. FIG. 18 shows an original point correction amount A1 calculated by the CPU 26 according to the first embodiment of the present invention. The timing chart of FIG. 18 shows that the original point correction amount A1 substantially corresponds to the fluctuation of the total detected value S6 on which the drift amount due to the secular deterioration is reflected. That is, the original point correction amount A1 is calculated considering the drift amount of the total detected value S6 due to the secular deterioration of the sensors 21, 22, 23, and 24. Therefore, it is obvious that the original point correction amount is calculated with high accuracy.

Figure 19:
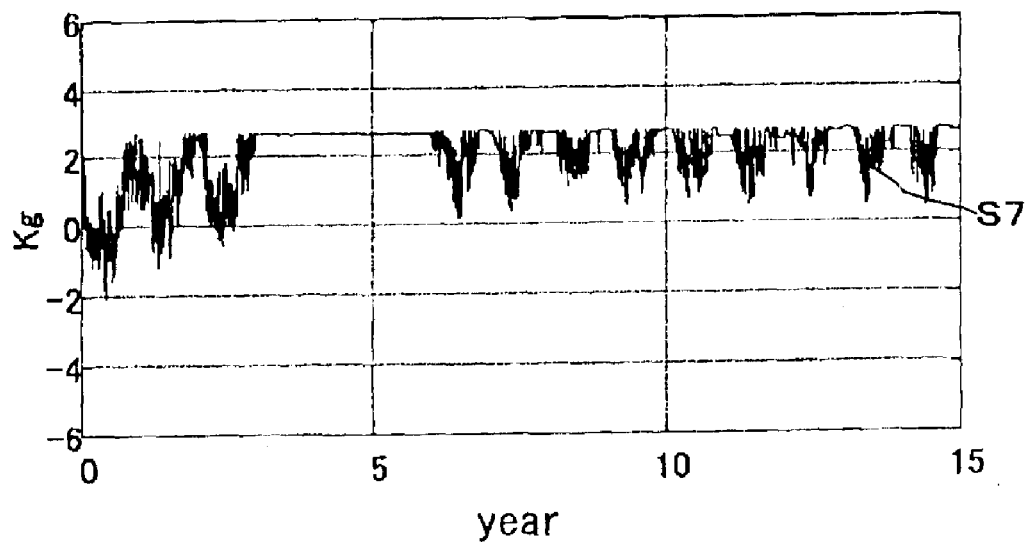
FIG. 19 is a timing chart for explaining the fluctuation of the total detected value illustrated in FIG. 16 within a second threshold value defined by threshold values HK1 and HK2.
Figure 20:
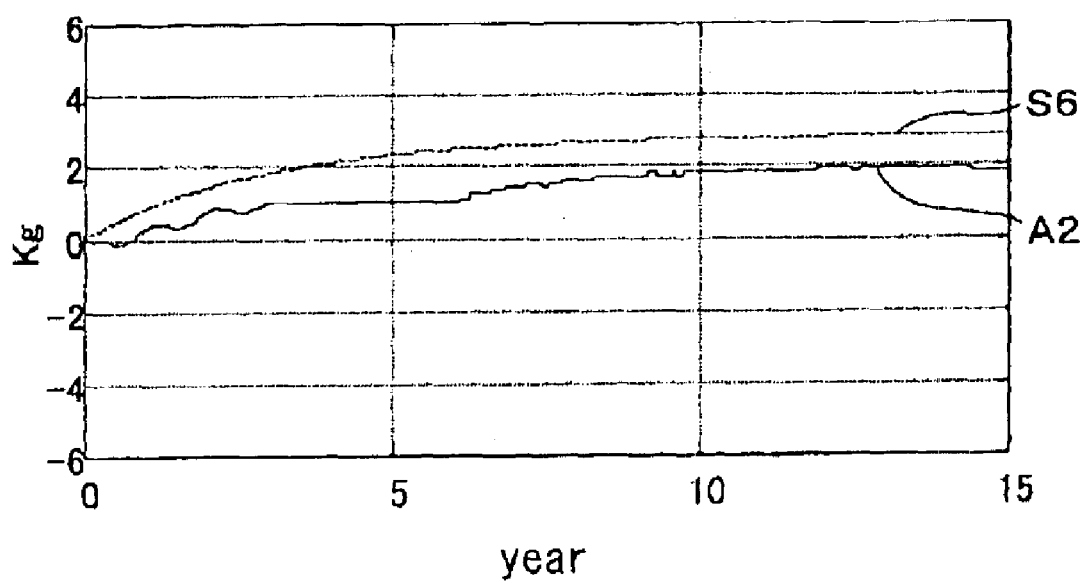
FIG. 20 is a timing chart for explaining the fluctuation of the original point correction amount according to a modified mode of the first embodiment.

As a modified mode of the first embodiment, the original point correction amount calculating process can be performed without setting the first threshold value of the values SK1 and SK2, i.e. without performing the process at step 121 of the flowchart illustrated in FIG. 7. In this case, the other steps for performing the original point correction amount calculating process according to the first embodiment are performed in the same manner. FIG. 19 shows the total detected value S7 within the second threshold value of the HK1 and HK2. FIG. 20 shows an original point correction amount A2 calculated by the CPU 26 according to the modified mode of the first embodiment. As illustrated in FIG. 20, it is obvious that the original point correction amount A2 substantially corresponds to the fluctuation of the total detected value S6. That is, the original point correction amount A2 is calculated considering the drift amount of the total detected value S6 due to the secular deterioration of the sensors 21, 22, 23, 24. However, compared with the timing chart of FIG. 18, the original point correction amount A1 according to first embodiment can be calculated with higher accuracy than the original point correction amount A2 according to the modified mode of the second embodiment.

Figure 21:
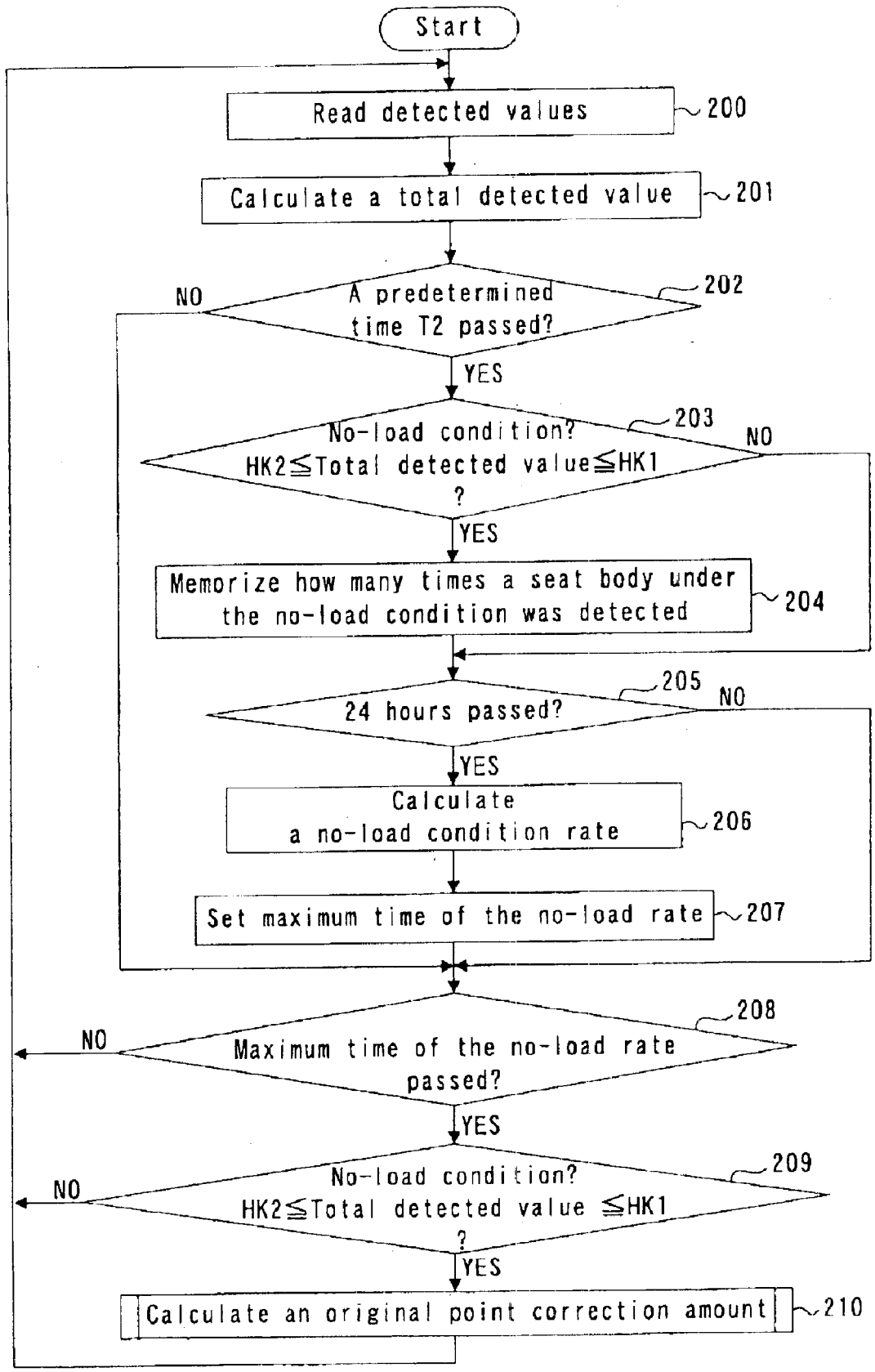
FIG. 21 is a flowchart explaining a process for calculating the original point correction amount according to the second embodiment of the present invention.

Next, the series of process of the CPU 26 according to a second embodiment of the present invention is described hereinbelow with reference to a flowchart illustrated in FIG. 21. The process illustrated in FIG. 21 is performed at the predetermined cycle (e.g. a few msec) when the ignition switch (not illustrated) of the vehicle is switched on in response to the turning operation of the vehicle key (not shown) inserted into the key cylinder (not shown) in the same manner as the flowchart illustrated in FIG. 5 according to the first embodiment. The CPU 26 performs the initial processing in response to the switch on of the ignition switch and then performs the main routine from step 200 illustrated in FIG. 21 at the predetermined cycle time, wherein the detected values from the sensors 21, 22, 23, and 24 are inputted into the CPU 26. The process then proceeds to step 201 for calculating the total detected value by summing the detected values by the sensors 21, 22, 23, and 24. At step 202, the CPU 26 judges whether or not a predetermined time T2 has already passed from the previous process, from the last process during the normal mode. It is preferable that the predetermined time T2 is preset to be smaller than 24 hours, such as one hour. When the CPU 26 judges at step 202 that the predetermined time T2 has not passed yet from the last process during the normal mode, the process proceeds to step 208.

On the other hand, when the CPU 26 judges at step 202 that the predetermined time T2 has passed from the last process during the normal mode, the process proceeds to step 203 for judging whether or not no load has been applied to the seat body 1, i.e. for judging whether or not the seat body 1 has been under a no load condition. The total detected value of the detected values by the sensors 21, 22, 23, and 24 is one of preferable parameters for judging whether or not the seat body 1 is under the no load condition. The process at step 203 is performed for judging whether or not the total detected value is within the second threshold values HK1, HK2, which possesses a predetermined range substantially equal to or less than the threshold value HK1 and substantially equal to or greater than the threshold value HK2. In this case, the threshold values HK1 and HK2 according to the second embodiment are the same as the values according to the first embodiment. However, the values are not necessarily limited to the embodied values as far as the values are set to be the value from which the total detected value under the original point won't deviate only due to the secular deterioration. When the total detected value is within the second threshold values HK1, HK2 at step 203, i.e. when the total detected value represents that the seat body 1 is under the no load condition, the process proceeds to step 204 for counting how many times the seat body 1 under the no load condition was detected every the predetermined time T2. The number of times is memorized in the memory housed in the CPU 26. On the other hand, when the total detected value deviates from the second threshold value at step 203, the CPU 26 judges that any load has been applied to the seat body 1. The process then proceeds to step 205 without counting how many times the seat body 1 under the no load condition was detected.

At step 205, the CPU 26 judges 24 hours have passed from the last process during the normal mode. When 24 hours have not passed yet, the process proceeds to step 208. On the other hand, when 24 hours has passed from the last process during the normal mode, the process proceeds to step 206 for calculating probability that the seat body 1 is detected to be under the no load condition every predetermined time T2. For example, assuming that the seat body 1 being applied with any load is detected N times every predetermined time T2 and the seat body 1 under the no load condition is detected NL times, the probability of the seat body 1 under the no load condition can be expressed in accordance with the following formula:

The rate of the seat body 1 under the no load condition= NL/N×100(%). The calculated probabilities are stored in the memory every predetermined time T2 for the last 24 hours. At step 207, the CPU 26 extracts a time, at which the seat body under the no load condition is calculated at the maximum rate for the last 24 hours, and stores the time in the predetermined memory. That is, at step 207, the CPU 26 selects the time at which the seat body 1 under the no load condition is calculated at the maximum rate for 24 hours. The time selected by the CPU 26 at step 207 is referred to as a maximum time of no-load rate.

At step 208, the CPU 26 judges whether or not the maximum time of no-load rate has passed from the last process during the normal mode. When the CPU 26 judges that the time has not passed yet, the process directly returns to step 200 and the processes from step 200 to step 207 are repeatedly performed. On the other hand, when the CPU 26 judges that the time has passed at step 208 such as in the middle of the night when the vehicle is not driven, the process proceeds to step 209 so as to judge whether the total detected value by the sensors 21, 22, 23, and 24 is within the second threshold value defined by the threshold values HK1 and HK2. When the total detected value deviates from the second threshold value at step 209, the process returns to step 200 so as to repeatedly perform the processes from step 200 to step 207. On the other hand, when the total detected value is within the second threshold value, the same filtering process is performed by the low pass filter 29 as the first embodiment.

That is, the original point correction amount is calculated at step 210 in the same manner as illustrated in FIG. 7 according to the first embodiment. The process then returns to step 200 so as to repeatedly perform the process at the predetermined cycle.

As described above, the original point correction is performed when the maximum time of no-load rate has passed so as to detect the actual load applied to the seat body 1 according to the second embodiment, thereby the original point correction can be performed with an improved accuracy.

According to a modified mode for performing the original point correction in consideration of the load applied to the seat body 1, the timer in the CPU 26 can be employed for calculating the total detected value while the seat body 1 is under the no load condition such as when the occupant is asleep, for example from one o'clock in the morning to six o'clock in the morning. If the total detected value is within a predetermined load value, the original point correction can be performed assuming that the seat body 1 is under the no load condition.

According to a further modified mode, the CPU 26 monitors that the ignition switch was switched off and judges whether or not the vehicle is under a stationary condition. The CPU 26 further monitors fluctuation of the loads detected by the sensors 21, 22, 23, and 24. When each detected load is stabilized within a predetermined load value, the CPU 26 judges that the seat body 1 is under the no-load condition so that the original point correction is performed.

In any cases, the original point correction according to the present invention can be performed when the detected load is stabilized, wherein the original point correction can be performed with an improved accuracy.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Fluctuations and changes may be made by others, and equivalents employed, without departing from the spirit of the present invention. Accordingly, it is expressly intended that all such fluctuations, changes and equivalents which fall within the spirit and scope of the present invention as defined in the claims, be embraced thereby.

What is claimed is:

1. An occupant weight detecting device comprising;
   a load detecting means for detecting a load applied to a seat body;
   a calculating means for calculating an initial load value based upon a detected load value by the load detecting means and for calculating an occupant load value applied to the seat body by subtracting the initial load value from the detected load value; and
   a filter means with a cutoff frequency so as to attenuate a fluctuation of the detected load value due to elements except a deterioration inherent to the load detecting means.

2. An occupant weight detecting device according to claim 1, wherein the calculating means sets a first threshold value including a first range and the detected load value is filtered by the filter means when the detected load value is within the first range.

3. An occupant weight detecting device according to claim 2, wherein the calculating means sets a second threshold value including a second range in the first range and corresponds to a fluctuation of the detected load value due to the deterioration inherent to the load detecting means, and the detected load value is filtered when the detected load value is within the second range.

4. An occupant weight detecting device according to claim 3, wherein the filter means filters the detected load value when an output value from the filter reaches within the second range after the detected load value is within the first range and deviates from the second range.

5. An occupant weight detecting device according to claim 3, wherein the deterioration inherent to the load detecting means includes a secular deterioration of the load detecting means, and the fluctuation of the detected load value due to the secular deterioration is within the second range.

6. An occupant weight detecting device according to claim 1, wherein the cutoff frequency is set so as to attenuate a fluctuation of the detected load value due to an external environment.

7. An occupant weight detecting device according to claim 6, wherein the external environment includes a mechanical stress of the load detecting means, heat and moisture of the load detecting means, acid adherence to the load detecting means, lading or contact of an object with the seat body, temperature fluctuation of the load detecting means, a position fluctuation of a seat sliding mechanism, and a vehicle parking condition on a slope.

8. An occupant weight detecting device according to claim 1, wherein the initial load value is calculated under the initial condition when there is nothing on the seat body.

9. An occupant weight detecting device according to claim 1, wherein the load detecting means is a load sensor for detecting the load applied to the seat body.

10. An occupant weight detecting device according to claim 9, wherein the load sensor is provided with a distortion detecting element for electrically detecting a distorted amount which is applied to the seat cushion.

11. A method for detecting an occupant weight comprising:

a load detecting means for detecting a load applied to a seat body;

a correction amount calculating means for calculating an original point correction amount based on a passed time of which the original point correction amount is calculated;

an occupant load calculating means for calculating an occupant load applied to a seat body by subtracting the original point correction amount calculated by the correction amount calculating means from the detected load by the load detecting means; and a filter means with a cutoff frequency so as to attenuate a fluctuation of the detected load value due to elements except a deterioration inherent to the load detecting means.

12. A method for detecting an occupant weight according to claim 11, wherein the original point correction amount is calculated based upon the detected load by the load detecting means when there is nothing on the seat body.

13. A method for detecting an occupant weight according to claim 11, further comprising:

a seat belt condition judging means for judging whether a seat belt is fastened; and a first judging means for judging whether the detected load is within a range when the seat belt is judged to be fastened, wherein the detected load value is filtered by the filter means when the detected load value is judged to be within the range.

14. A method for detecting an occupant weight according to claim 13, further comprising:

an output value judging means for judging whether an output value from the filter reaches within the range after the detected load value is judged to deviate from the range, wherein the detected load value is filtered by the filter when the output value from the filter is judged to be within the range after the detected load value is judged to deviate from the range.

15. A method for detecting an occupant weight according to claim 13, further comprising:

a sign judging means for judging whether or not a sign of the detected load value is identical to a sign of the output value from the filter when the output value from the filter is judged to deviate from the range, wherein the detected load value is filtered by the filter means when the sign of the detected load value differs from the sign of the output value from the filter.

16. A method for detecting an occupant weight according to claim 15, further comprising:

a second judging means for judging whether the detected load value is within the range when the seat belt is judged to be fastened, wherein the original point correction amount is calculated when the detected load value is judged to deviate from the range and the output value from the filter means is judged within the range.

17. A method for detecting an occupant weight according to claim 13, wherein the range corresponds to a fluctuation of the detected load value due to deterioration inherent to the load detecting means.

* * * * *